(12) United States Patent
Ali et al.

(10) Patent No.: US 8,798,662 B2
(45) Date of Patent: Aug. 5, 2014

(54) TRANSMISSION CONTROL FOR A SPECIFIC ABSORPTION RATE COMPLIANT COMMUNICATION DEVICE

(75) Inventors: Shirook Ali, Waterloo (CA); James Womack, Irving, TX (US); Houssam Kanj, Waterloo (CA); Amin Mobasher, Stanford, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 1284 days.

(21) Appl. No.: 12/536,339

(22) Filed: Aug. 5, 2009

(65) Prior Publication Data

US 2011/0034135 A1  Feb. 10, 2011

(51) Int. Cl.
*H04B 7/00* (2006.01)
*H04B 1/38* (2006.01)

(52) U.S. Cl.
CPC .................................. *H04B 1/3838* (2013.01)
USPC ........................................................ 455/522

(58) Field of Classification Search
CPC ..... H04B 7/0404; H04B 1/036; H04W 24/02; H04W 52/42
USPC ....................................................... 455/103
See application file for complete search history.

(56) References Cited

U.S. PATENT DOCUMENTS

| 6,388,997 | B1 | 5/2002 | Scott |
| 6,708,041 | B1 | 3/2004 | Butovitsch et al. |
| 2002/0167930 | A1 | 11/2002 | Pearl |
| 2003/0064761 | A1* | 4/2003 | Nevermann .................... 455/572 |
| 2003/0228891 | A1 | 12/2003 | Kobayashi et al. |
| 2003/0232630 | A1 | 12/2003 | Wilhelm |
| 2004/0085940 | A1* | 5/2004 | Black et al. .................... 370/337 |

(Continued)

FOREIGN PATENT DOCUMENTS

| EP | 0843421 A2 | 5/1998 | |
| EP | 1229664 A1 * | 8/2002 | ............... H04B 1/38 |

(Continued)

OTHER PUBLICATIONS

Ali, Shirook, et al.; U.S. Appl. No. 12/722,362; Title: Modulation and Coding Scheme Selection Method for a Specific Absorption Rate Complaint Communication Device; Filed: Mar. 11, 2010.

(Continued)

*Primary Examiner* — Ankur Jain
(74) *Attorney, Agent, or Firm* — Conley Rose, P.C.; Maria L. Sekul; J. Robert Brown, Jr.

(57) ABSTRACT

Transmission of data from a portable communication device to a station via a radio frequency signal uses a protocol that has recurring frames, each having a plurality of transmission slots, different numbers of which can be used to transmit the data. When the portable communication device desires to send a data transmission, a first value is selected for either a power level for the radio frequency signal or the number of transmission slots to use. Then the first value is used to select a second value for the other one of the power level and the number of transmission slots. The first and second values are selected so that the data transmission at the selected power level using the selected number of transmission slots does not result in a specific absorption rate that is greater than a specific absorption rate limit.

16 Claims, 6 Drawing Sheets

(56) References Cited

U.S. PATENT DOCUMENTS

| | | | |
|---|---|---|---|
| 2005/0113103 A1 | 5/2005 | Snowden et al. | |
| 2005/0157678 A1* | 7/2005 | Mantha et al. | 370/329 |
| 2006/0182067 A1 | 8/2006 | Rinne et al. | |
| 2008/0085736 A1 | 4/2008 | Kitamura et al. | |
| 2009/0028261 A1 | 1/2009 | Zhang et al. | |
| 2009/0213955 A1 | 8/2009 | Higuchi et al. | |
| 2011/0034135 A1 | 2/2011 | Ali et al. | |

FOREIGN PATENT DOCUMENTS

| | | |
|---|---|---|
| EP | 1298809 A2 | 4/2003 |
| EP | 1533915 A1 | 5/2005 |
| WO | WO03013020 A1 | 2/2003 |

OTHER PUBLICATIONS

Extended European Search Report; EP Application No. 10172095.1; Apr. 28, 2011; 10 pages.

PCT International Search Report; Application No. PCT/US11/27482; Jun. 9, 2011; 2 pages.

PCT Written Opinion of the International Searching Authority; Application No. PCT/US11/27482; Jun. 9, 2011; 8 pages.

Notice of Allowance dated Sep. 20, 2012; U.S. Appl. No. 12/722,362, filed Mar. 11, 2010; 8 pages.

European Examination Report; Application No. 10172095.1; Aug. 13, 2012; 5 pages.

Canadian Office Action; Application No. 2,712,133; Apr. 8, 2013; 3 pages.

Ali, Shirook, et al.; U.S Appl. No. 13/713,439; Title: Modulation and Coding Scheme Selection Method for a Specific Absorption Rate Complaint Communication Device; Filed: Dec. 13, 2012.

European Patent Office, Partial European Search Report, Application No. EP10172095, Feb. 2, 2011.

Office Action dated Mar. 16, 2012; U.S. Appl. No. 12/722,362, filed Mar. 11, 2010; 6 pages.

Office Action dated May 7, 2012; U.S. Appl. No. 12/722,362, filed Mar. 11, 2010; 27 pages.

Canadian Office Action; Application No. 2,712,133; Apr. 15, 2014; 5 pages.

* cited by examiner

TRANSMISSION CONTROL FOR A SPECIFIC ABSORPTION RATE COMPLIANT COMMUNICATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE DISCLOSURE

The present disclosure relates to portable communication device, examples of which include mobile, or handheld, devices such as pagers, cellular phones, cellular smartphones, wireless organizers, personal digital assistants, wirelessly enabled notebook computers, and the like; and more particularly to controlling the intensity of the wireless signals transmitted by such portable communication devices.

A wide variety of different types of portable wireless communication devices are on the market for communicating voice, data, images, and other forms of information. When being used, some of these devices are held against the ear of the user and some of the emitted radio frequency energy is absorbed by the user's body. A measurement of absorption of energy at a particular radio frequency is specified as a Specific Absorption Rate (SAR). As will be appreciated, the SAR value depends heavily upon the location of the transmitting antennas with respect to the body and the amount and the duration of the transmitted power. With a cell phone, for example, that is held against a person's ear, a greater intensity of radio frequency energy can be emitted by an antenna located near the bottom of the device positioned adjacent the jaw of the user as compared to when an antenna is located at the top of the device immediately adjacent to the ear.

Government agencies, such as the Federal Communication Commission (FCC) in the United States of America, have adopted limits for safe exposure to radio frequency (RF) energy. For example, the FCC limit for exposure from cellular telephones is a SAR level of 1.6 watts per kilogram (1.6 W/kg), which is referred to as a specific absorption rate limit.

Voice transmissions may employ a communication protocol in which the transmissions occur in a one millisecond transmission slot contained within a 20 millisecond frame, i.e., a given device transmits once every 20 milliseconds. When transmitting data, it is desirable to utilize as many of transmission slots in each frame as possible in order to send the data quickly. However, the more of the frame that is used, the greater the RF energy that is emitted and thus the specified SAR limit may be exceeded by the data transmission.

As a consequence, although the technology exists to increase the rate of data transfer, there is a concern that transmitting at a high data rate and a relatively high RF power could violate the SAR limit.

DETAILED DESCRIPTION OF THE DISCLOSURE

Figure 1:
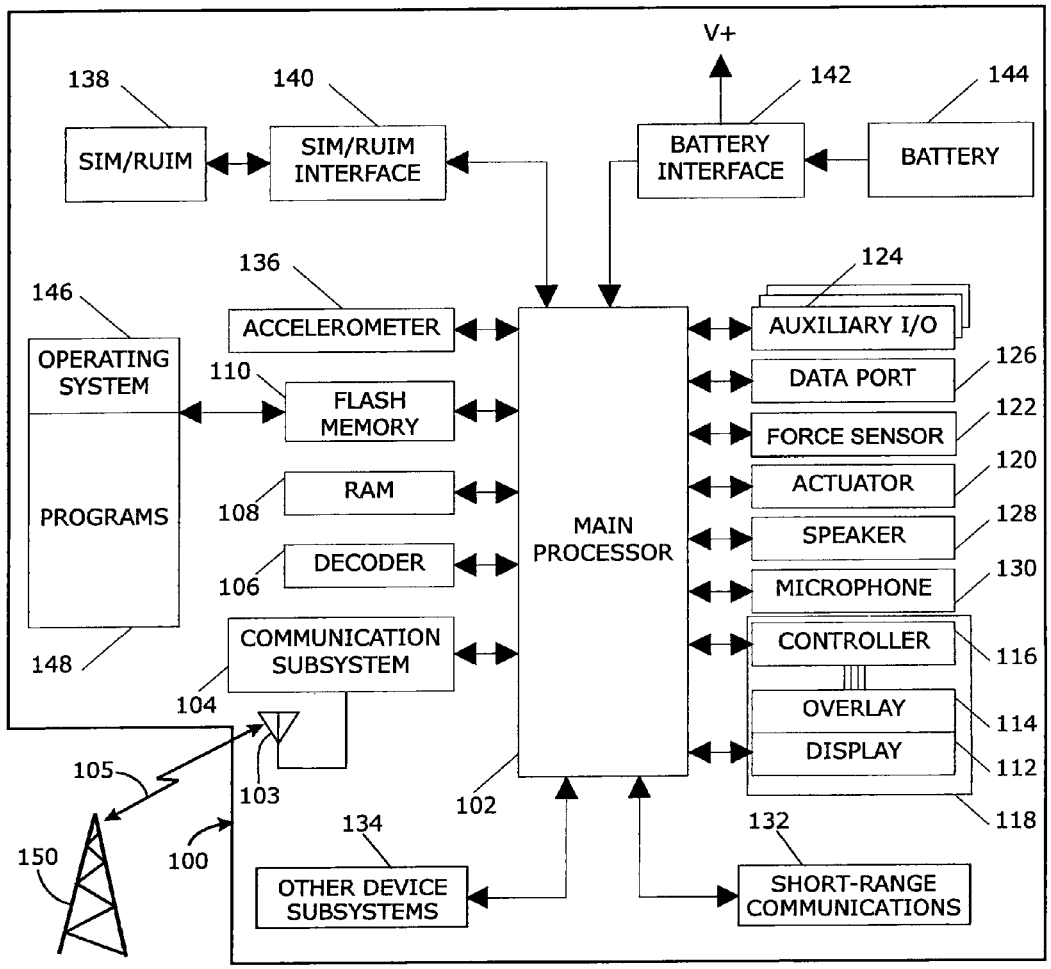
FIG. 1 is a block schematic diagram of the circuitry for an exemplary portable communication device that utilizes the present transmission control technique.

Transmission of data from a portable communication device to a station via a radio frequency signal is controlled in a manner so that the signal does not result in a specific absorption rate limit being exceeded. Transmission uses a protocol that has recurring frames, each having a plurality of transmission slots, different numbers of which can be used to transmit the data. A power level for the radio frequency signal and the specific number of transmission slots in each frame are selected so that the transmission complies with the specific absorption rate limit.

This signal control technique utilizes a predefined relationship between the power level for the radio frequency signal and the specific number of transmission slots in a frame that may be used to transmit the data without the radio frequency signal resulting in a specific absorption rate limit being exceeded. For example, this relationship may be defined by a look-up table that, for each of a plurality of different power levels, designates a maximum number of transmission slots that may be used.

When the portable communication device desires to send a data transmission, a first value is selected for either the power level or the number of transmission slots in each frame to use when transmitting the data. Then the first value and the predefined relationship are employed to select a second value for the other one of the power level or the number of transmission slots. These values are selected in a manner so that the data transmission does not result in a specific absorption rate that is greater than the specific absorption rate limit.

Examples of specific implementations of the present signal control technique now will be provided. For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to a portable communication device, examples of which include mobile, or handheld, devices such as pagers, cellular phones, cellular smartphones, wireless organizers, personal digital assistants, wirelessly enabled notebook computers, and the like.

With initial reference to FIG. 1, a portable communication device 100 includes a number of components such as a processor 102 that controls the overall operation of the portable communication device. Communication functions, including data and voice communications, are performed through a communication subsystem 104 that includes radio frequency transceiver connected to an antenna 103. Data received by the portable communication device 100 is decompressed and decrypted by a decoder 106. The communication subsystem 104 and an antenna 103 receive messages from and send messages to a station 150 via a radio frequency signal 105. The station 150 may be part of a wireless network, such as, but not limited to, data-centric wireless networks, voice-centric wireless networks, and dual-mode networks that support both voice and data communications over the same physical stations. The portable communication device 100 is a battery-powered device and includes a battery interface 142 for receiving one or more rechargeable batteries 144.

The processor 102 also interacts with additional subsystems such as a random access memory (RAM) 108, a flash memory 110, a display 112 with a touch sensitive overlay 114 connected to an electronic controller 116 that together make up a touch sensitive display 118, an actuator 120, a force sensor 122, an auxiliary input/output (I/O) subsystem 124, a data port 126, a speaker 128, a microphone 130, short-range communications subsystem 132 and other device subsystems 134. The processor 102 interacts with the touch-sensitive overlay 114 via the electronic controller 116. The processor 102 may also interact with an accelerometer 136. The accelerometer 43 may include a cantilever beam with a proof mass and suitable deflection sensing circuitry. The accelerometer 43 may be utilized for detecting direction of gravitational forces or gravity-induced reaction forces.

To identify a subscriber for network access according to the present embodiment, the portable communication device 100 uses a Subscriber Identity Module or a Removable User Identity Module (SIM/RUIM) card 138 inserted into a SIM/RUIM interface 140 for communication with a network of which the station 150 is a part. Alternatively, user identification information may be programmed into the flash memory 110.

The portable communication device 100 also includes an operating system 146 and software components 148 that are executed by the processor 102 and are typically stored in a persistent store such as the flash memory 110. Additional applications may be loaded onto the portable communication device 100 from the station 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable communication device 100 is substantially similar except that the received signals are output to the speaker 128 and signals for transmission are generated by the microphone 130.

Figure 2:
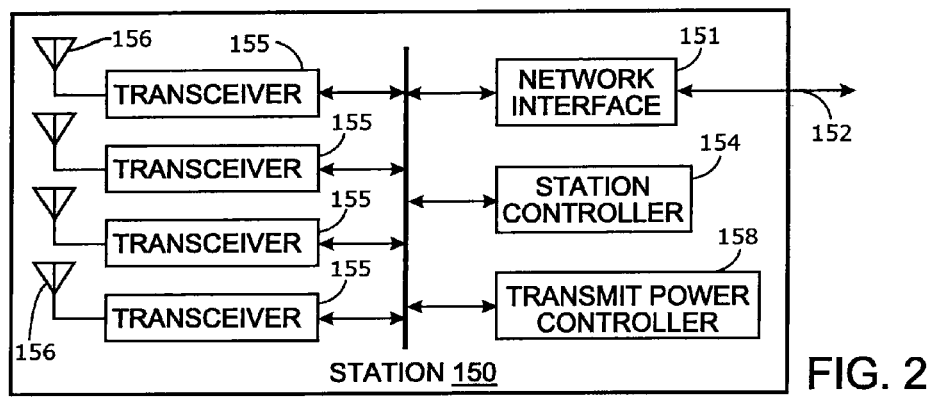
FIG. 2 is a block schematic diagram of the circuitry for an exemplary station with which the portable communication device communicates.

With reference to FIG. 2, the station 150 includes a network interface 151 for connecting with a cellular telephone network 152, for example. A station controller 154 governs the overall operation of the station as well as the establishment, maintenance, and release of radio frequency signal connections. The station controller 154 is connected to a plurality of transceivers 155, each having an antenna 156 for communicating with portable communication devices, such as device 100. Representative transceivers 155 are individually assigned to specific interactions with portable communication devices. At least one transceiver may be employed as a common control channel over which the station transmits common signaling such as a pilot signal. The common channel is monitored by mobile devices within or near that station's cell, and is also used to request a working channel (uplink) or to page a mobile device (downlink).

A transmit power controller 158 performs well known open loop and closed loop power management procedures to control the transmit power of the portable communication device transmissions received by the station, e.g., so that the strength of the signals received by the station 150 will be at a satisfactory level. As the portable communication device 100 travels away from the station 150 the strength of its signal received by that station decreases. If that signal strength decreases below an acceptable minimum threshold level, the station 150 instructs the portable communication device to increase the power level of its transmissions. In other situations, as the portable communication device 100 travels toward the station 150, the strength of the signal received at the station increases. When the signal strength exceeds a threshold level, the station instructs the portable communication device to decrease the transmit power level to conserve battery power. A designation of the strength of the radio frequency signals received from each portable communication device with which the station is communicating is stored in memory at the transmit power controller 158. Alternatively a designation of the power level for each of those stations may be determined by the transmit power controller 158 and stored in memory. The respective designation is communicated to the portable communication device as part of standard station keeping messages.

Figure 3:
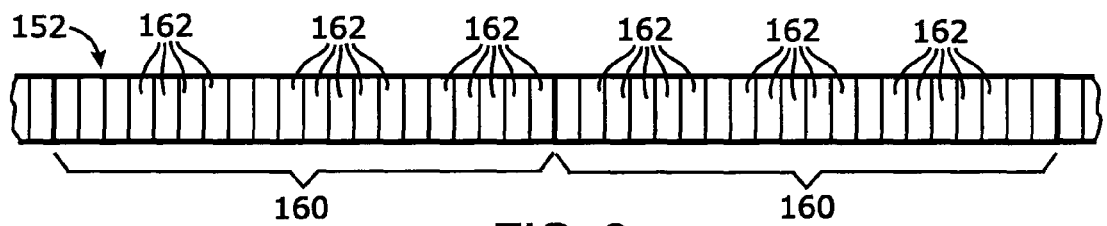
FIG. 3 graphically depicts a communication protocol used by the portable communication device.

The radio frequency signal 105 that is employed to transmit data from the portable communication device 100 to the station 150 utilizes a communication protocol which as depicted in FIG. 3 has recurring, contiguous frames 160 each of which is divided into a plurality of transmission slots 162. In the exemplary communication protocol, each frame 160 is segmented into twenty transmission slots although other quantities of slots may be used. The portable communication device 100 can transmit data in one or more of the transmission slots 162 within each frame. The more data slots in each frame that are used, the faster the data is transmitted. The number of transmission slots 162 in each frame 160 that is used to transmit data is referred to as the "duty cycle" of the transmission. For example, using half of the transmission slots in each frame provides a 50% duty cycle, whereas employing all the slots results in a 100% duty cycle. However, using more data slots in a frame increases the specific absorption rate (SAR) produced by the radio frequency signal 105. Therefore, there may be a limit to the number of the slots within a given frame that can be used at a particular transmission power level without exceeding a specific absorption rate limit. As used herein the specific absorption rate limit may be a stated in regulations of a governmental agency or may be a SAR value that has been selected for use with the present technique.

As noted previously, it is desirable to control the portable communication device 100 so that its transmissions do not result in the specific absorption rate limit being exceeded. This limits the user's exposure to radio frequency (RF) energy. For that limiting function, the portable communication device 100 and the station 150 utilize a transmission control technique that selects the transmit power level and the number of transmission slots in each frame to use for a data transmission that will be SAR compliant. The transmission control technique may be performed solely by the portable communication device 100, solely by the station 150, or cooperatively by both. Each of these alternative implementations will be described herein.

Figure 4:
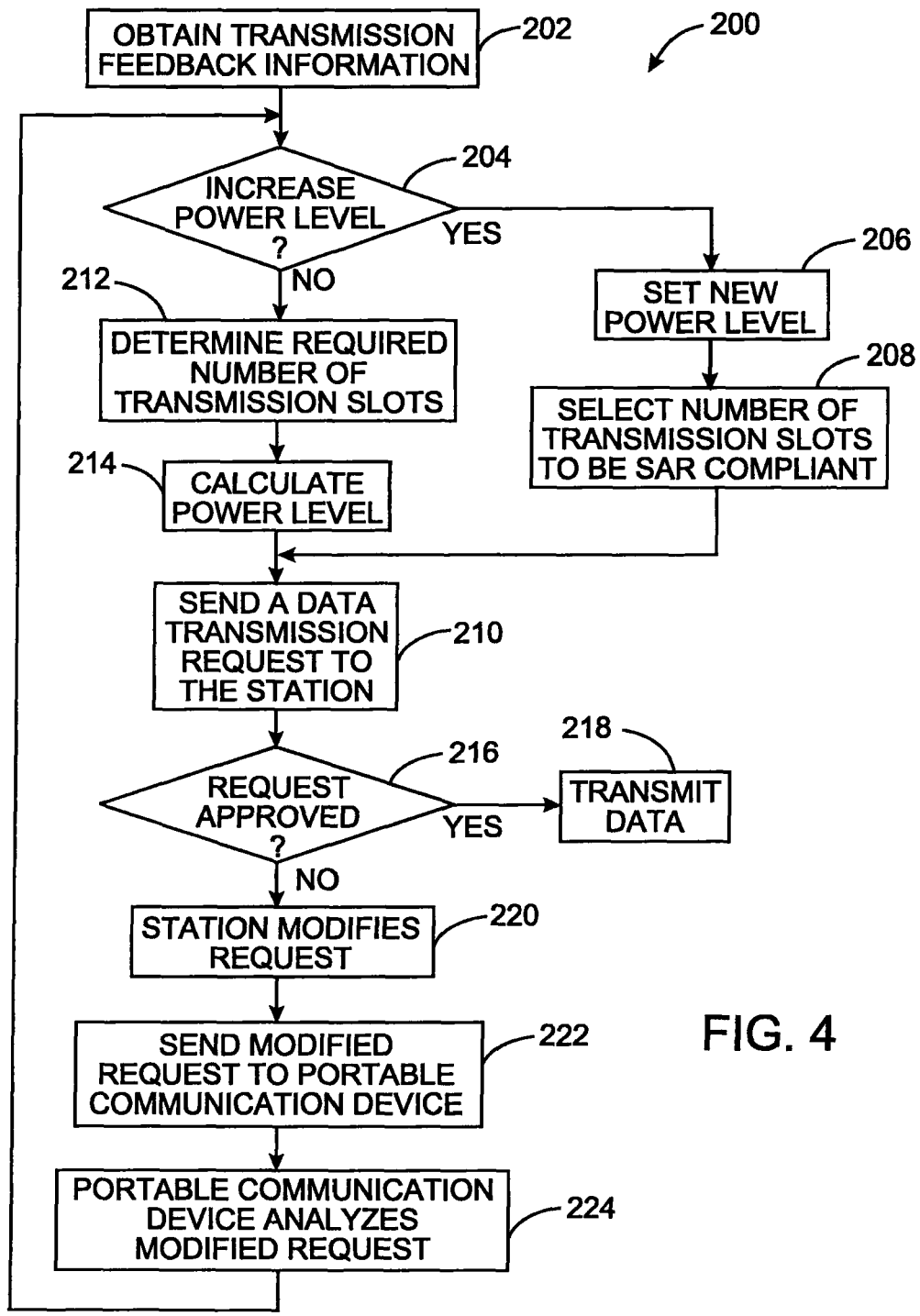
FIG. 4 is a flowchart of a first implementation of the transmission control technique.

With reference to FIG. 4, the transmission control technique 200 can be implemented within the portable communication device using information received from a station 150. The technique 200 commences at step 202 at which the portable communication device 100 retrieves information previously received from the station regarding earlier communication. Such information as conventionally transmitted to the portable communication devices by various types of communication networks and includes the Transmit Power Control information (TPC), the Modulation and Coding Scheme (MCS), and the Transport Data Block Size (TBS). This conventional transmission information enables the portable communication device to determine the parameters of the data transmission that are permitted with respect to the station 150. The portable communication device also knows at step 202 the amount of data that it needs to transmit to the station.

At step 204 the portable communication device uses the Transmit Power Control (TPC) information to determine whether its previously used transmit power level needs to be increased in order to provide an adequate signal strength for reception by the station. The Transmit Power Control information is conventionally exchanged between the stations and portable communication devices to ensure that each portable communication device transmits at an adequate signal level. If the power level needs to be changed, the program execution advances to step 206 at which an adequate power level is set. Thereafter at step 208 the portable communication device 100 selects the given number of transmission slots in each frame that can be used to send data at the selected power level without the radio frequency signal resulting in an excessively high specific absorption rate.

In order to select the given number of transmission slots to use in each frame, the SAR characteristics and limitations for the antenna of the particular portable communication device 100 must be known and stored in that device. The SAR information is used by transmission control technique 200 to define a relationship between variation of the power level for the radio frequency signal and the number of the transmission slots in a frame that may used to transmit the data without exceeding the specific absorption rate limit. That relationship can be defined by specifying, for each of the discrete power levels at which data can be transmitted, the maximum number of transmission slots in each frame that can be used without exceeding the specific absorption rate limit.

This transmission power and slot number relationship was derived, during design of the portable communication device 100, by selecting a nominal power level $p_n$ and a nominal number of transmission slots $t_n$ to provide a nominal transmission configuration. Then a nominal specific absorption rate $SAR_n(f)$, that results from transmitting data at radio frequency f using the nominal transmission configuration, is derived. That derivation utilizes the technique specified in IEEE standard 1528-2003 promulgated by The Institute of Electrical and Electronics Engineers Inc., New York, N.Y., U.S.A.

The nominal power level $p_n$, the nominal number of transmission slots $t_n$, and the nominal specific absorption rate $SAR_n(f)$ are used to linearly extrapolate values for the other possible given power levels and given numbers of transmission slots at which the data may be transmitted by the portable communication device. That extrapolation uses the equation:

$$SAR_{ext}(f, p, t) = SAR_n(f) \frac{p \cdot t}{p_n \cdot t_n}$$

where $SAR_{ext}(f,p,t)$ is the extrapolated specific absorption rate value for a particular transmission configuration, f is the frequency of the radio frequency signal, while p is the given power level and t is the given number of transmission slots for the particular transmission configuration. For each given power level, the value of the given number of transmission slots is varied to find the maximum number at which the calculation yields an extrapolated SAR value that does not exceed the specific absorption rate limit.

Figure 5:
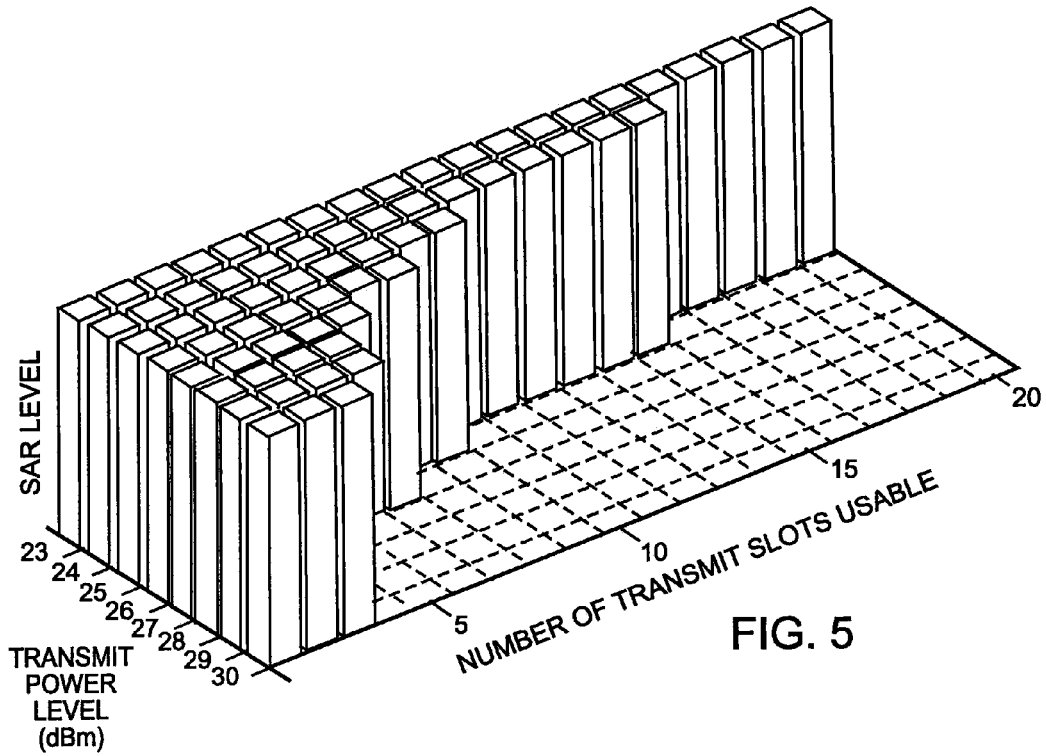
FIG. 5 is a graph illustrating a relationship between the transmit power level, the number of transmission slots used in a transmission frame, and the specific absorption rate.
Figure 10:
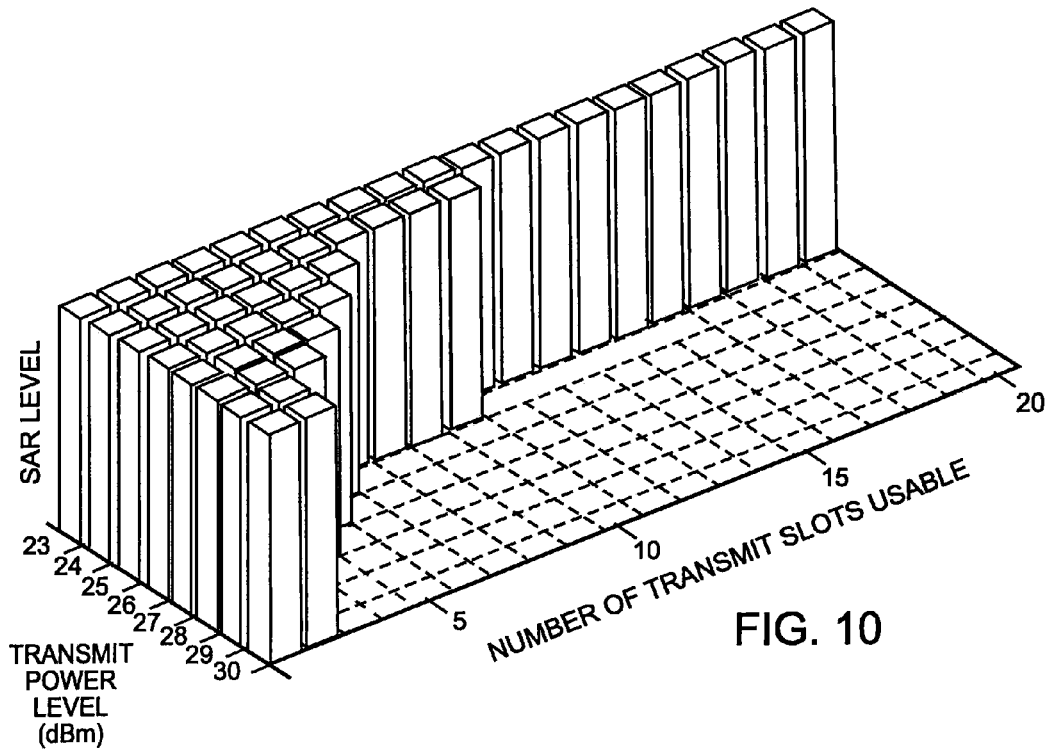
FIG. 10 is a graph illustrating a relationship between the transmit power level, the number of transmission slots used in a transmission frame, and the specific absorption rate when the antenna of a portable communication device is adjacent an ear of a user.

This process for defining the relationship between variation of the power level for the radio frequency signal and the number of the transmission slots in a frame produces a set of data, an example of which is depicted graphically in FIG. 5. The vertical bars indicate a transmission configuration of a given power level and given number of transmission slots that is SAR compliant, i.e., at which the specific absorption rate resulting from the corresponding radio frequency signal does not exceed the specific absorption rate limit. As can be seen, the greater the transmit power level, the fewer number of slots that can be used for communication before the specific absorption rate limit is exceeded. For example, at a power level of 23 dBm all twenty transmission slots in the frame can be used to send data, whereas at 25 dBm only nine transmission slots can be used without exceeding the specific absorption rate limit.

Returning to the transmission control technique 200 in FIG. 4 and specifically step 208, the relationship between variation of the power level for the radio frequency signal and the number of the transmission slots used in a frame to transmit data is employed to select the proper number of transmission slots for the requested data transmission. This relationship may be specified by a look-up table which is indexed by the different power levels available for the portable communication device 100 to use. For each of those power levels, the look-up table specifies the maximum number of transmission slots that may be used and still produce an SAR compliant data transmission. Thus the main processor 102 uses the given power level that was set at step 206 to find the corresponding given number of transmission slots in the look-up table for the respective antenna. Instead of using a look-up table, a mathematical expression may be used to define the relationship between the power level and the number of transmission slots which produce an SAR compliant radio frequency signal. In this case, the processor 102 solves that expression for the number of transmission slots to use in each frame. The transmission control technique then advances to step 210.

Alternatively, if at step 204 the main processor 102 of the portable communication device 100 determined from the transmission information that the presently set power level was adequate to convey the data to the station 150 no adjustment of that power level is required. In this situation, the transmission control technique 200 advances to step 212 at which the portable communication device 100 needs to improve the data rate and determine the required number of transmission slots necessary to achieve the desired data rate. Thereafter at step 214, the main processor 102 employs the SAR relationship between the transmission power level and the number of transmission slots to calculate the power level for the number of transmission slots that will still produce an SAR compliant data transmission. Step 214 uses the same technique as step 208 described above.

Next, the transmission control technique advances to step 210. Now the portable communication device 100 sends a transmission request to the station 150 indicating the requisite power level and selected number of transmission slots in order for that transmission to be SAR compliant.

Selection of both the given power level and the given number of transmission slots completes a preliminary definition of a transmission configuration. However, use of the selected number of transmission slots by the portable communication device 100 may not be possible if other devices are actively communicating in some of those transmission slots. Therefore, upon receiving the transmission request, the station controller 154 checks the availability of the given number of transmission slots in the transmission configuration at step 216. If that number of transmission slots is available, the process advances to step 218 at which the station grants the transmission request by sending an appropriate message to the portable communication device 100.

Otherwise if that selected number of transmission slots is not available at step 216, the process branches to step 220 at which the station controller 154 modifies the transmission request based on the amount of network traffic and conditions of the communication channel. For example, the station controller 154 may decrease the given number of transmission slots in the transmission configuration to an amount that is available for use by the requesting portable communication device 100. At step 222, the modified transmission request then is sent to the portable communication device which analyzes that request at step 224. The transmission control technique 200 then returns to step 204 to repeat the process to determine whether the modified transmission request is SAR compliant and if not the request is further adjusted to be compliant. Eventually this process derives a transmission configuration in which the power level and number of transmission slots is acceptable to the station 150 which then issues a transmission approval at step 218 to which the portable communication device responds by transmitting the data to the station 150.

Figure 6:
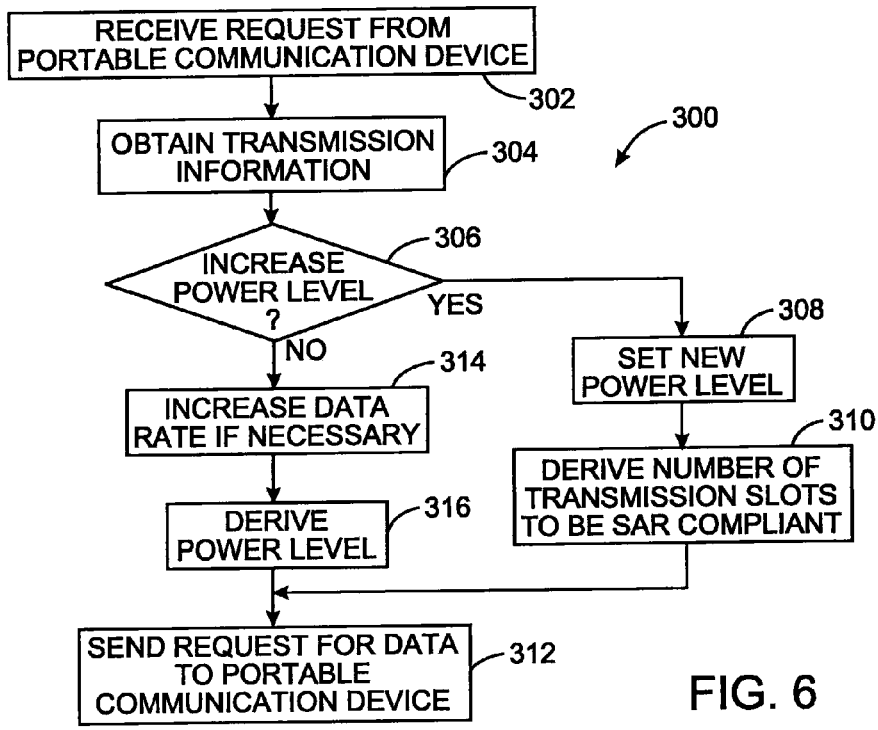
FIG. 6 is a flowchart of a second implementation of the transmission control technique.

In the transmission control technique 200 shown in FIG. 4, the portable communication device 100 performs the selection of a transmission configuration that will ensure SAR compliance. As an alternative, the station 150 can be programmed to ensure that the data transmission will not exceed the absorption rate limit. An example of this alternative control technique 300 is depicted in the flowchart of FIG. 6.

This procedure commences at step 302 upon the receipt of a request to transmit from the portable communication device 100. This causes the station to obtain the Transmit Power Control information, the last transmit power level used by that portable communication device or the portable communication device's sounding reference signal (SRS) at step 304. Based on that information, the station 150 at step 306 determines if the portable communication device needs to increase its power level.

If so, the program execution advances to step 308 at which the station determines the proper power level that the portable communication device 100 should use in order to provide a satisfactory signal level at the station 150. Next, at step 310 the power level is employed to determine the number of transmission slots that can be used to transmit data and without exceeding the specific absorption rate limit. This step utilizes the same relationship between variation of the power level for the radio frequency signal and the number of transmission slots in a frame as described with respect to step 208 in FIG. 4. Thus, step 310 utilizes the SAR characteristics and limitations of the antenna of the particular portable communication device to determine the number of permitted transmission slots to use at the selected power level. This results in the station defining a transmission configuration which is then sent to the portable communication device at step 312 as part of a transmission request approval. The portable communication device 100 then employs that designated power level and number of slots to send data to the station 150.

Alternatively, if at step 306 a determination is made by the station 150 that the portable communication device 100 does not have to increase its power, the transmission control technique 300 branches to step 314 at which a determination is made whether the portable communication device needs to increase its data rate in order to efficiently send data to the station 150. The result of the processing at step 314 is a determination of the number of transmission slots that should be employed. The process then advances to step 316 at which the determined number of slots is employed to derive the transmit power level that can be used without the transmission exceeding the specific absorption rate limit. This step employs a process similar to that described previously with respect to step 214 in FIG. 4. This results in the station 150 determining both the power level and the number of transmission slots that the portable communication device 100 may use to efficiently send the data without exceeding the SAR limit. This transmission configuration is then transmitted to the portable communication device at step 312 as part of transmission request approval. Upon receiving that uplink transmission grant the portable communication device 100 utilizes that transmission configuration to send the data.

Figure 7:
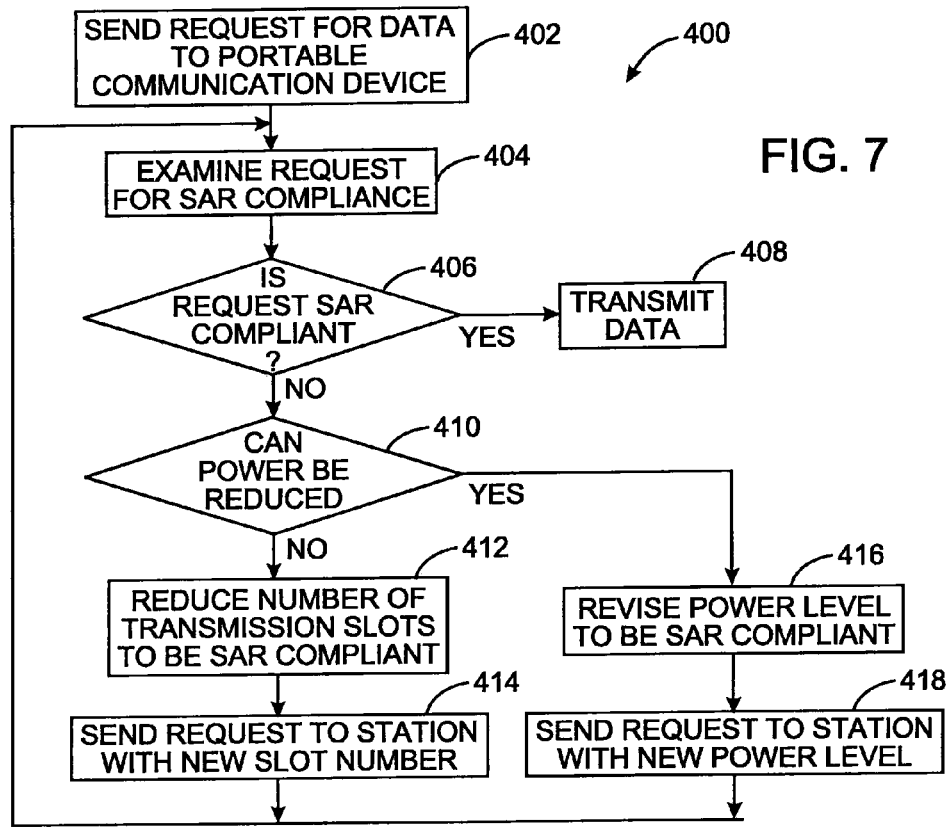
FIG. 7 is a flowchart of a third implementation of the transmission control technique.

With reference to FIG. 7, a third implementation of a transmission control technique 300 involves the station 150 proposing a transmission configuration to the portable communication device 100 which determines whether or not that configuration will exceed the specific absorption rate limit. This process commences at step 402 at which the station 150 sends a request to send data to the portable communication device 100. That request to send data specifies a power level and a number of transmission slots to utilize. The proposed power level is based on the previous power level used by the portable communication device 100 and may be increased if the previous transmission provided an inadequate signal level. The proposed number of transmission slots is also determined by the station 150 based on the number of transmission slots in that channel which are available to use, i.e., which are not being used by other portable communication devices. At step 404 the portable communication device 100 examines the request to send data to determine whether the transmission configuration is SAR compliant. Specifically that portable communication device utilizes the relationship between variation of its power level for radio frequency signals and a number of transmission slots in a frame and the SAR level. As noted previously, this relationship is defined empirically based on the design of the portable communication device and the relationship data is stored within the memory of the portable communication device 100. Such a relationship may be defined by a mathematical expression or by a look-up table that correlates the different transmission levels and maximum number of frame slots which may be utilized without exceeding the SAR limit. That evaluation then results in a determination being made at step 406 whether the proposed transmission configuration from the station is SAR compliant. If so, the configuration is used by the portable communication device 100 to transmit data at step 408.

Otherwise if at step 406 a determination is made that the proposed transmission configuration will result in the specific absorption rate limit being exceeded, the process branches to step 410 at which the portable communication device decides whether the proposed power level can be reduced and still provide a satisfactory signal level for receipt at the station. If the power level cannot be reduced, the process branches to step 412 at which the proposed number of transmission slots is reduced to provide a signal at the denoted power level that will not exceed the specific absorption rate limit. The adjusted transmission configuration is then sent to the station 150 as an adjusted request to send data, and the process returns to step 404 to verify that this request will be SAR compliant.

Alternatively if at step 410 a determination was made that the proposed power level can be reduced, the process branches to step 416. At this point, the relationship between variation of the power level for the radio frequency signal and the number of transmission slots in a frame for this particular portable communication device is utilized to reduce the power level in order to preserve the proposed number of transmission slots requested by the station. The adjusted power level is then sent as an alteration request at step 418 to the station 150. Thereafter the process returns to step 404 to verify that the new transmission configuration will be SAR compliant, i.e., will result in a transmission that does not exceed the specific absorption rate limit. Eventually the process completes a loop at which a determination is made at step 406 that the proposed transmission configuration of a power level and selected number of transmission slots will not exceed the specific absorption rate limit thereby resulting in the data being transmitted in step 408.

Figure 8:
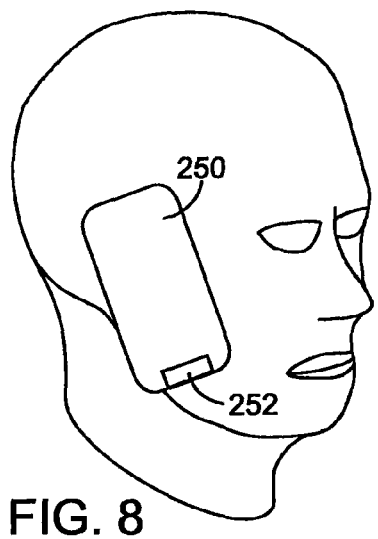
FIG. 8 pictorially depicts a person using a portable communication device that has a single antenna.
Figure 9:
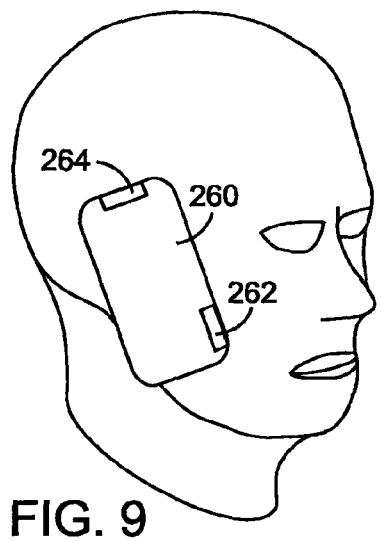
FIG. 9 pictorially depicts a person using a portable communication device that has multiple antennas.

Some portable communication devices have a single antenna, while other devices have two antennas to improve communication performance for increased data throughput and range without requiring additional bandwidth or transmit power. Whether an excessively high specific absorption rate will occur also depends on the position of the antenna 103 in the portable communication device 100. For example as shown in FIG. 8, when an antenna 252 is located at the bottom of the portable communication device 250, that antenna is positioned near the jaw of a user when transmitting. The specific absorption rate limit from this antenna orientation may be 0.9 W/kg, for example. In contrast, the portable communication device 260 in FIG. 9 is designed for multiple-input, multiple-output (MIMO) operation and thus has two antennas 262 and 264. The first antenna 262 is located adjacent the jaw of the user and thus has a specific absorption rate limit that is similar to that for the single antenna 252 in FIG. 8. However, the second antenna 264 is located adjacent an upper region of the user's head in which radio frequency energy is absorbed at a greater rate. Thus, transmissions from the second antenna 264 have a different specific absorption rate limit, such as 1.3 W/kg, for example.

As noted previously, the relationship between varying the power level of the radio frequency signal and the number of the transmission slots used in a frame for the antenna 252 at the bottom of the portable communication device 250 in FIG. 8 produces the set of data depicted graphically in FIG. 5. This same graphical depiction of the power level and the number of the transmission slots applies to the first antenna at the bottom of the MIMO portable communication device 260 in FIG. 9. However, the second antenna 264 is located adjacent an upper region of the user's head in which radio frequency energy is absorbed at a greater rate. Thus, a different relationship between power level and number of transmission slots exists for a specific absorption rate limit compliant transmission from the second antenna 264 as depicted in FIG. 8. Note that for most of the different power levels, a lesser number transmission slots may be used without exceeding the specific absorption rate limit as compared to the first antenna 262. The transmission configuration relationships for each antenna depicted by the graphs are specified as look-up tables stored in the memory of the station controller 154 (FIG. 2).

Therefore in order to select the given number of transmission slots to use in each frame, the SAR characteristics and limitations for each antenna of the particular portable communication device 260 must be known. That information may be stored in the portable communication device 260 and then sent in a message to the station 150 at any time prior to the data transmission request. Alternatively the SAR information may be known by the station 150 a priori through data provided by station operator when the owner of the portable communication device 260 contracts for communication service.

Figure 11:
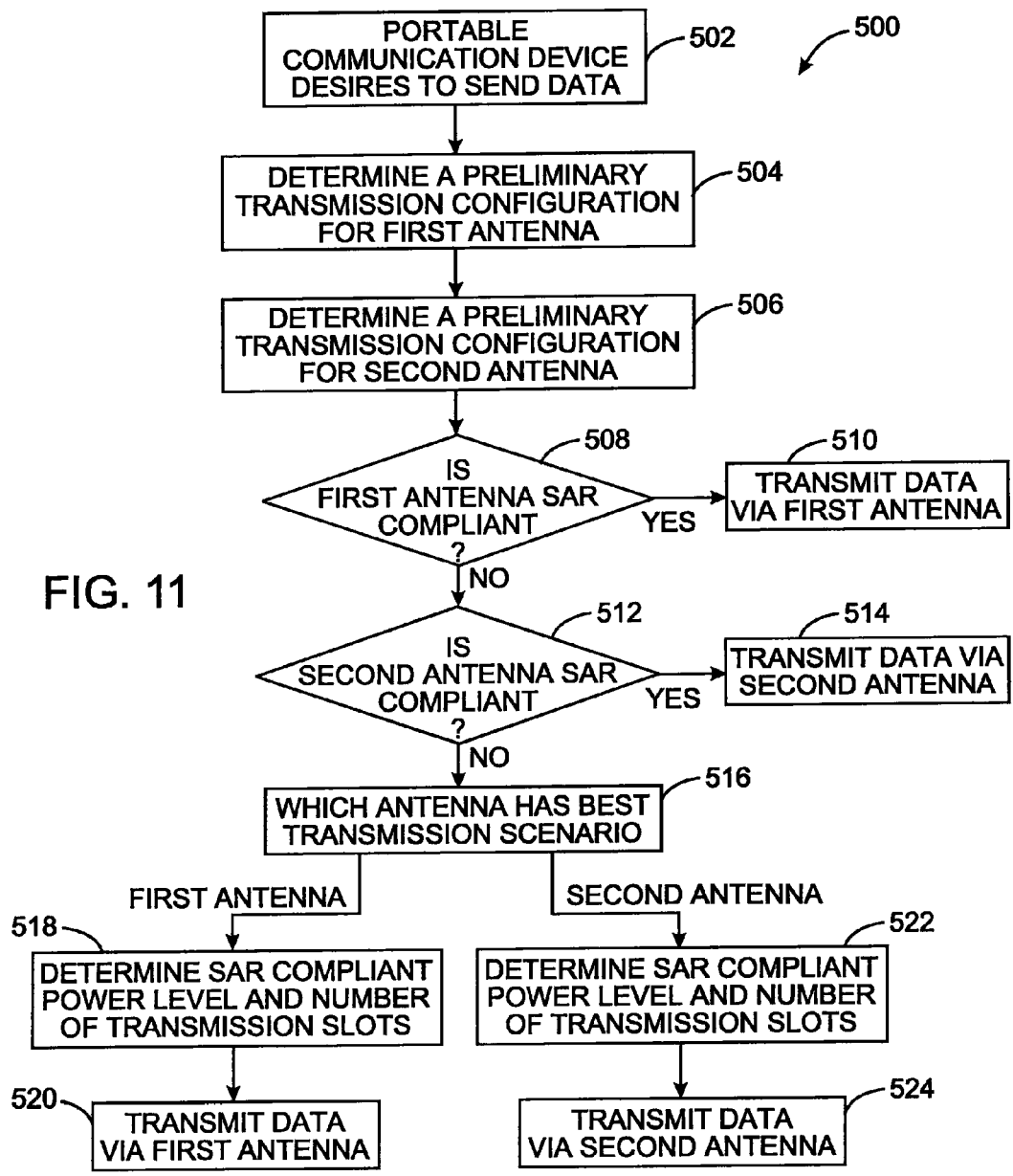
FIG. 11 is a flowchart of a fourth implementation of the transmission control technique for a portable communication device that has two antennas.

The transmission control technique 500 shown in FIG. 11 is used with the portable communication device 260 that has two antennas 262 and 264. This technique commences at step 502 when either the portable communication device wishes to transmit data or when it receives a request for data from the station 150. At that time the process advances to step 504 at which a preliminary transmission configuration, i.e., transmission power level and number of frame slots, for the first antenna 262 is determined. This process involves utilizing the conventional procedure for selecting a power level that will provide an adequate signal strength at the station. This may be accomplished using the conventional transmission power control (TPC) procedure. Then the portable communication device 260 determines the number of transmission slots that will provide an optimum data transmission rate for the amount of data that is to be sent. That number of slots is then sent to the station 150 as a transmission request in order to determine whether the optimum number of slots are available. The station responds by indicating how many slots are actually available for use by this particular portable communication device depending upon the slot usage by other devices communicating with the same station. The power level and the approved number of transmission slots then become the preliminary transmission configuration that can be used for the first antenna 262 at this time. The process then advances to step 506 where the procedure is repeated for determining a preliminary transmission configuration for the second antenna 264. It should be noted that different radio frequency channels may be used for each of the two antennas and thus they will have different preliminary transmission configurations depending upon the usage of each particular channel.

Thereafter a decision is made at step 508 whether the preliminary transmission configuration for the first antenna will be SAR compliant, i.e., the radio frequency signal will not exceed the specific absorption rate limit. If the SAR limit will not be exceeded, the process branches to step 510 where the first antenna 262 is used to transmit the data. Otherwise, if the preliminary transmission configuration for the first antenna 262 is not SAR compliant, the process branches to step 512 at which a determination is made whether the preliminary transmission configuration for the second antenna 262 will be SAR compliant. If so, the second antenna 264 is used to transmit the data at step 514.

In the case where neither preliminary transmission configuration for the first or second antenna 262 or 264 is SAR compliant, the transmission control technique 500 advances to step 516 where a determination is made as to which of the two antennas has the best transmission scenario. In other words, which antenna's preliminary transmission configuration exceeds the respective specific absorption rate limit by the least amount. Depending upon which antenna has the best transmission scenario, the process branches to either step 518 or 522 at which the power level and/or the number of transmission slots to be used is adjusted in order to yield a radio frequency signal that will not exceed the specific absorption rate limit for that respective antenna. This step involves a similar process to that described with respect to the previous transmission control techniques in which the relationship between variation of the power level for the radio frequency signal, the number of transmission of slots used in each frame, and the specific absorption rate is employed to derive the power level and number of such transmission slots for a radio frequency signal that will not exceed the specific absorption rate limit. Once that compliant transmission configuration has been determined at either step 518 or 522, the process advances to step 520 or 524, respectively, at which the selected antenna 262 or 264 is used to transmit the data at that transmission configuration.

The foregoing description was primarily directed to a preferred embodiment of the disclosure. Although some attention was given to various alternatives within the scope of the disclosure, it is anticipated that one skilled in the art will likely realize additional alternatives that are now apparent from of the embodiments described herein. Accordingly, the scope of the protection provided hereby should be determined from the following claims and not limited by the above disclosure.

The invention claimed is:

1. A method for transmitting data from a portable communication device to a station via a radio frequency signal, wherein data is transmitted using a protocol that has recurring frames, each having a plurality of transmission slots, different numbers of which can be used to transmit the data, the method comprising:
defining a relationship between variation of a power level for the radio frequency signal and the number of the transmission slots in a frame that can be used by the portable communication device to transmit the data without the radio frequency signal resulting in a specific absorption rate (SAR) limit being exceeded;
the portable communication device determining whether an increase in power level for the data transmission is needed;
when determining that an increase in power level is needed, the portable communication device selecting a desired power level for the radio frequency signal and using the desired power level and the relationship to select a maximum number of transmission slots for which the data transmission does not result in a SAR exceeding the SAR limit; and
when determining that an increase in power level is not needed, the portable communication device determining that an improvement in data rate is needed, determining a number of transmission slots required for providing the needed data rate, and calculating a power level based on the number of required transmission slots for which the data transmission does not result in a SAR exceeding the SAR limit.

2. The method as recited in claim 1 further comprising the portable communication device requesting permission from the station to transmit the data using the maximum number of transmission slots.

3. The method as recited in claim 2 further comprising the station determining whether the maximum number of transmission slots is available for use by the portable communication device, and if not, the station changes the number of transmission slots that the portable communication device may use to transmit the data.

4. The method as recited in claim 3 further comprising the station sending a grant of permission to the portable communication device, wherein the grant designates a changed number of transmission slots.

5. The method as recited in claim 1 further comprising the portable communication device, responding to the desired power level and the maximum number of transmission slots, by selecting one of a plurality of antennas from which to transmit data.

6. A method for transmitting data from a portable communication device to a station via a radio frequency signal, wherein data is transmitted using a protocol that has recurring frames, each having a plurality of transmission slots, different numbers of which can be used to transmit the data, the method comprising:
defining a relationship between variation of a power level for the radio frequency signal and the number of the transmission slots in a frame that can be used by the portable communication device to transmit the data without the radio frequency signal resulting in a specific absorption rate (SAR) limit being exceeded;
the station performing steps of:
determining whether an increase in power level for the data transmission is needed;
when determining that an increase in power level is needed, selecting one of a plurality of power levels available to use for the radio frequency signal, thereby designating a given power level and in response to the given power level and the relationship, selecting a maximum number of transmission slots in a frame, wherein transmission of the data by the portable communication device at the given power level and in the maximum number of transmission slots does not result in the SAR limit being exceeded; and
when determining that an increase in power level is not needed, determining if an increase in data rate is needed, determining a number of transmission slots required for providing the needed data rate, and deriving a power level based on the number of required transmission slots, wherein transmission of the data by the portable communication device in the number of transmission slots required for providing the needed data at the derived power level does not result in the SAR limit being exceeded.

7. The method as recited in claim 6 wherein selecting one of a plurality of power levels selects a power level that produces a radio frequency signal that has a predefined signal strength at the station.

8. The method as recited in claim 6 wherein defining a relationship for each of the plurality of power levels comprises designating a predefined number of transmission slots in a frame that can be used to transmit the data without exceeding the specific SAR limit.

9. The method as recited in claim 8 wherein selecting a maximum number of transmission slots, selects the predefined number of transmission slots in a frame designated for the given power level.

10. The method as recited in claim 8 wherein selecting a maximum number of transmission slots, selects a lesser one of the maximum number of transmission slots that actually are available to use in a transmission frame and the predefined number of transmission slots in a frame designated for the given power level.

11. The method as recited in claim 6 further comprising the station sending to the portable communication device a designation of the given power level and the maximum number of transmission slots that was selected.

12. The method as recited in claim 6 further comprising sending information related to the SAR limit from the portable communication device to the station.

13. A portable communication device that transmits data to a station via a radio frequency signal, wherein data is transmitted using a protocol that has recurring frames, each having a plurality of transmission slots different numbers of which can be used to transmit the data, the portable communication device comprising:
   a control system having logic for:
      storing a relationship between variation of a power level for the radio frequency signal and the number of the transmission slots in a frame that can be used by the portable communication device to transmit the data without the radio frequency signal resulting in a specific absorption rate (SAR) limit being exceeded;
      determining whether an increase in power level for the data transmission is needed;
      when determining that an increase in power level is needed, selecting a desired power level for the radio frequency signal and using the desired power level and the relationship to select a maximum number of transmission slots so that the data transmission does not result in a SAR that is greater than the SAR limit; and
      when determining that an increase in power level is not needed, further determining that an improvement in data rate is needed, determining a number of transmission slots required for providing the needed data rate, and calculating a power level based on the number of required transmission slots for which the data transmission does not result a SAR that is greater than the SAR limit.

14. The portable communication device as recited in claim 13 further comprising the control system requesting permission from the station to transmit the data using the maximum number of transmission slots.

15. The portable communication device as recited in claim 14 further comprising the logic responding to receipt of a response to requesting permission which response contains a revised number of transmission slots that the portable communication device may use to transmit the data.

16. The portable communication device as recited in claim 13 further comprising the portable communication device, responding to the given responding to the desired power level and the maximum number of transmission slots, by selecting one of a plurality of antennas from which to transmit data.

* * * * *

UNITED STATES PATENT AND TRADEMARK OFFICE
CERTIFICATE OF CORRECTION

PATENT NO.        : 8,798,662 B2
APPLICATION NO.   : 12/536339
DATED             : August 5, 2014
INVENTOR(S)       : Shirook Ali et al.

Page 1 of 1

It is certified that error appears in the above-identified patent and that said Letters Patent is hereby corrected as shown below:

In the Claims:

In Column 14, Claim 16, line 26 should read: "responding to the desired power level"

Signed and Sealed this
Twenty-eighth Day of April, 2015

Michelle K. Lee
*Director of the United States Patent and Trademark Office*